(12) United States Patent
Edmiston

(10) Patent No.: US 8,563,649 B2
(45) Date of Patent: Oct. 22, 2013

(54) METHOD OF TREATING A MATERIAL USING A SOL-GEL DERIVED COMPOSITION

(75) Inventor: Paul L. Edmiston, Wooster, OH (US)

(73) Assignee: ABS Materials, Inc., Wooster, OH (US)

( * ) Notice: Subject to any disclaimer, the term of this patent is extended or adjusted under 35 U.S.C. 154(b) by 161 days.

(21) Appl. No.: 13/157,280

(22) Filed: Jun. 9, 2011

(65) Prior Publication Data

US 2011/0306500 A1    Dec. 15, 2011

Related U.S. Application Data

(63) Continuation-in-part of application No. 12/819,940, filed on Jun. 21, 2010, now Pat. No. 8,119,759.

(60) Provisional application No. 61/353,417, filed on Jun. 10, 2010, provisional application No. 61/356,094, filed on Jun. 18, 2010.

(51) Int. Cl.
*C08L 83/04* (2006.01)

(52) U.S. Cl.
USPC .............................. 524/588; 528/35

(58) Field of Classification Search
USPC ............................. 528/35; 524/588
See application file for complete search history.

(56) References Cited

U.S. PATENT DOCUMENTS

2004/0247895 A1 * 12/2004 Dreja et al. .................. 428/446

* cited by examiner

*Primary Examiner* — Kuo-Liang Peng
(74) *Attorney, Agent, or Firm* — Arent Fox LLP

(57) ABSTRACT

Disclosed is a method and system that includes treating a material by applying a sol-gel derived composition loaded with a first sorbate under conditions effective to treat the material with the first sorbate.

24 Claims, No Drawings

METHOD OF TREATING A MATERIAL USING A SOL-GEL DERIVED COMPOSITION

CROSS REFERENCE TO RELATED APPLICATION

This application is a continuation-in-part application of U.S. patent application Ser. No. 12/819,940, filed Jun. 21, 2010 (now U.S. Pat. No. 8,119,759, issued on Feb. 21, 2012), entitled "SWELLABLE SOL-GELS, METHODS OF MAKING, AND USE THEREOF," the entirety of which is incorporated herein by this reference. This application also claims priority from provisional U.S. Patent Application Ser. No. 61/353,417, filed Jun. 10, 2010, entitled "SWELLABLE ORGANOSILICAS FOR CONTROLLED RELEASE, RECOVERY AND DELIVERY OF NON-POLAR CHEMICAL AGENTS, the entirety of which is incorporated herein by this reference. This application also claims priority from provisional U.S. Patent Application Ser. No. 61/356,094, filed Jun. 18, 2010, entitled "SWELLABLE ORGANOSILICAS FOR TARGETED THERAPEUTIC AGENT DELIVERY AND RE-CAPTURE," the entirety of which is incorporated herein by this reference.

STATEMENT REGARDING FEDERALLY FUNDED RESEARCH OR DEVELOPMENT

This invention was made with Government support under National Science Foundation Grant No. 0930371.

BACKGROUND OFF HE INVENTION

1. Field of the Invention

The present invention relates generally to the chemical arts. More particularly, the invention relates to a method for the treating a material using a sol-gel controlled release of a sorbate, such as a pesticide, a herbicide or a pharmaceutical substance.

2. Discussion of the Related Art

Millions of pounds of chemical agents, including biologically active agents, such as pesticides, herbicides and pharmaceuticals are applied each year to mitigate damage to crops and to promote animal and human health. Methods of application often lead to the chemical agent entering the surrounding environment through water run-off, evaporation, sublimation or through human animal excrement. Consequently, there is a definite need for a method of controlling the rate of release of such chemical agents in order to prevent or minimize such unwanted effects.

SUMMARY OF THE INVENTION

Now in accordance with the invention there has been found a method and system that meets these needs and provides additional advantages. Disclosed is a method and system that includes treating a material by applying a sol-gel derived composition loaded with a first sorbate under conditions effective to treat the material with the first sorbate. In some aspects, the sol-gel derived composition is substantially completely loaded with the sorbate and, in some aspects, the sol-gel derived composition is partially loaded with the sorbate.

In some aspects, the sol-gel derived composition is an aromatically-bridged, organosiloxane sol-gel derived composition containing a plurality of alkylsiloxy substituents. And in some aspects, the sol-gel derived composition is an aromatically-bridged, organosiloxane sol-gel derived composition containing a plurality of alkylsiloxy substituents and a cosmetically acceptable carrier.

In some embodiments, the first sorbate is biologically active. And is some such embodiments, the first sorbate is a pesticide, a herbicide or a pharmaceutical In some such embodiments, the first sorbate is atrazine, 2,4-dichlorophenoxyacetic acid, malathion, dichlorodiphenyltrichloroethane, imipramine, a vitamin or a polypeptide.

In some aspects, the loading density of the sorbate in the sol-gel derived composition is from about 0.005 to about 5 gram sorbate per gram of the sol-gel derived composition. And in some aspects, the loading density of the sorbate in the sol-gel derived composition is from about 0.005 to about 5 gram sorbate per gram of the sol-gel derived composition.

In some embodiments, the method additionally includes applying a second sorbate after application of the first sorbate. In some of these embodiments, the second sorbate is a water soluble organic liquid and, in some of these embodiments, the second sorbate is ethanol.

In some embodiments, the sol-gel derived composition is applied to a plant or an animal. And, in some embodiments, the sol-gel derived composition is applied to a human.

In some embodiments, the sol-gel derived composition is applied to a soil. And, in some, embodiments, an unloaded sol-gel derived composition is applied along with the loaded sol-gel derived composition. In some of these embodiments, the sol-gel derived composition includes inert particles having a diameter of from about 5 to about 20 nm. In some of these embodiments, the inert particle is magnetic and in some embodiments, the sol gel-derived composition containing magnetic particles is removed from the treated material using a magnetic device.

Also disclosed area skin-care preparations, personal care preparations, light-protective preparations, containing a sol-gel derived composition. In some aspects, the sol-gel derived composition is formulated with a non-liquid pharmaceutically effective carrier or a cosmetically acceptable earner.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

Unless otherwise defined, all Technical terms used herein have the same meaning as commonly understood by one of ordinary skill in the art to which the present invention pertains.

As used herein, the term "sorbate" means an organic compound that is taken up by the sol-gel derived compositions whether by adsorption, absorption, or a combination thereof.

As used herein, "swellable" means an increase of at least 1.5 times the volume of the sol-gel derived composition, when placed in excess sorbate compared to the volume when dry.

As used herein, "nanoparticle" means a particle sized between about 2 and about 500 nanometers in one dimension.

In accordance with the invention, there has been discovered a novel method for treating a material by applying a sol-gel derived composition loaded with a first sorbate. In some embodiments, the sol-gel derived composition is swell able to at least 1.5 times its volume, when dry, in acetone. Preferred sol-gel derived compositions are swellable to at least two times their original volume, more preferably at least five times their original volume, and in some embodiments up to about eight to ten times their original volume. The swelling of the sol-gel derived composition and the sorption of the first sorbate are driven by the release of stored tensile force rather than by chemical reaction.

In some embodiments, the sol-gel derived composition is a porous, aromatically-bridged, organosiloxane sol-gel derived composition containing a plurality of alkyl siloxy substituents. In such embodiments, the sol-gel derived composition contains a plurality of flexibly tethered and interconnected organosiloxane particles having diameters on the nanometer scale. The organosiloxane nanoparticles form a disorganized porous matrix defined by a plurality of cross-linked aromatic siloxanes.

The porous, aromatically bridged, organosiloxane sol-gel derived compositions contains a plurality of polysiloxanes that include an aromatic bridging group flexibly linking the silicon atoms of the polysiloxanes. Such organosiloxane nanoparticles have a multilayer configuration comprising a hydrophilic inner layer and a hydrophobic, aromatic-rich outer layer.

The preparation of sol-gel derived compositions useful in accordance with the inventive method is disclosed in U.S. Pat. No. 7,790,830 which patent is herein incorporated by reference. A suitable swellable sol-gel derived composition is Osorb® swellable sol-gel derived composition available from ABS Materials, Wooster, Ohio.

The porous, swellable sol-gel derived compositions is loaded with a first sorbate. It is an advantage of the invention that a wide variety of sorbates can be used. In some embodiments, the sorbate is biologically active. Representative biologically active sorbates include, but are not limited to, pesticides, herbicides, such as atrazine, 2,4-dichlorophenoxyacetic acid, malathion, and dichlorodiphenyltrichloroethane and pharmaceuticals, including drugs such as impramine, vitamins and polypeptides.

The sol-gel derived compositions are loaded with a first sorbate using any suitable method. For example, the sol-gel derived composition can be contacted with the first sorbate under conditions sufficient to cause the sol-gel derived composition to sorb the sorbate. In an alternative embodiment, a nonvolatile first sorbate, such as impramine, can be mixed with a volatile second sorbate, such as ethanol or a mixture of ethanol and dichloromethane, where the second sorbate is chosen because of its effectiveness in swelling the sol-gel derived composition. The sol-gel derived composition is contacted with the mixture, the mixture is healed, for example up to about 180° F. (tire decomposition temperature of the sol-gel derived composition), to remove the volatile second sorbate and produce a sol-gel derived composition loaded with the first sorbate. In another alternative embodiment, the sol-gel derived composition is contacted with an aqueous solution containing a water soluble first sorbate, such as atrazine. In yet another alternative embodiment, the sol-gel derived composition is first swollen with a sorbate and the sorbate is exchanged for a first water soluble sorbate by rinsing the swollen sol-gel derived composition with an aqueous solution containing the water-soluble sorbate.

The loading density of the first sorbate in the sol-gel derived composition depends on the required concentration, application time and physical characteristics of the sorbate. The particular loading density for a specific application can be readily determined by one skilled in the art without undue experimentation. In some embodiments, the loading density of the sorbate in the sol-gel derived composition is from about 0.005 to about 5 gram sorbate per gram of the sol-gel derived composition. And in some embodiments, the loading density of the sorbate in the sol-gel derived composition is from about 0.01 to about 1 gram sorbate per gram of the sol-gel derived composition.

In some embodiments, the sol-gel derived composition is completely loaded with the first sorbate, i.e., the sol-gel derived composition has been treated under conditions such that substantially no additional sorbate can be sorbed by the sol-gel derived composition. In other embodiments, the sol-gel derived composition is only partially loaded with the first sorbate. When a sol-gel derived composition partially loaded with a first sorbate is subsequently contacted with a second sorbate, the sol-gel derived composition swells thus more quickly releasing the first sorbate.

The sol-gel derived composition can be used in any suitable form, including in powder or pellet forms. In some embodiments and in particular those embodiments where the sol-gel derived composition is in pellet form, the porous swellable sol-gel derived composition is combined with a binder. Useful polymeric binders include microcrystalline cellulose and elastomeric polymers. Preferred elastomeric polymers have a glass transition temperature below about 150° C., the temperature at which the sensor material begins to decompose. For, example, polystyrene and is a currently most preferred elastomeric polymer binder. Other suitable thermoplastic elastomers are described in U.S. Pat. Nos. 7,834,093, 7,799,873, 7,799,868, 7,799,869, 7,790,805, 7,786,206, 7,776,968, 7,771,627, 7,744,781, 7,737,206, 7,655,719, 7,462,309, 6,596,792, 6,162,849, 5,194,480, 7,837,901, 7,815,998, 7,645,399, 7,608,342, 7,550,097, 7,402,616, 6,720,369, 4,634,730, 7,834,093, 7,799,873, 7,799,868, 7,799,869, 7,790,805, 7,786,206, 7,776,968, 7,771,627, 7,744,781, 7,737,206 which patents are herein incorporated by reference. Pellets can be formed in any desired shape and size suitable for their desired application.

It is an advantage of the inventive method, that it is useful in treating a wide variety of materials, including, without limitation, soil, plants and animals, including mammals, and humans.

The sol-gel derived composition are applied by any suitable method. The affinity of the sol-gel derived composition for the sorbate then provides for the slow desorption of the sorbate from the sol-gel derived composition at a measured rate. Other factors that can be used to influence tire rate of release include the concentration gradient and the size of the sorbate.

In some embodiments, after application of the sol-gel derived composition partially loaded with the first sorbate to the material, the material is treated with a second sorbate. Suitable second sorbates include, without limitation, water soluble organic liquids, such as ethanol. Sufficient second sorbate is applied to cause the sol-gel derived composition to swell and thus increase the rate of desorption of the first sorbate.

In some embodiments, both loaded and unloaded sol-gel derived composition are applied to the material. For example, the unloaded sol-gel derived composition can be applied to an area different than the area where the loaded, sol-gel derived composition is applied, e.g., an area where no treatment is desired. As the sorbate is released from the loaded sol-gel derived composition, it is sorbed by the unloaded sol-gel derived composition, thus providing control not only over the rate but the area of application of the sorbate.

In some embodiments, especially in those embodiments where the sol-gel derived composition is applied as an amendment to soil, the sol-gel derived composition can additionally include inert particles having a diameter of from about 5 to about 20 nm. The particles can be chosen to increase the density of the sol-gel derived composition, thus, inhibiting the travel of the sol-gel derived composition in high winds or heavy rain.

And in some of these embodiments, the inert particles are made of a magnetic material, such as metallic iron or magnetite. It is an advantage of sol-gel derived composition containing such magnetic particles that they can be readily removed from a material, once treatment is completed, using a magnetic device.

Representative formulations containing the sorbate loaded sol-gel derived composition, include, but are not limited cosmetics, cleansers (e.g., skin cleansers), and medicaments, including pharmaceuticals in the form of tablets, capsules, ointments, or the like.

Cosmetic formulations according to the invention can be contained in a wide variety of cosmetic preparations. Representative formulations include, but are not limited to, skincare preparations, e.g. skin emulsions, multi-emulsions or skin oils and body powders; cosmetic personal care preparations, e.g. facial make-up in the form of lipsticks, lip gloss, eye shadow, liquid make-up, day creams or powders, facial lotions, creams and powders (loose or pressed); and light-protective preparations, such as sun tan lotions, creams and oils, sun blocks and pro-tanning preparations.

The compositions according to the invention comprise a liquid or non liquid cosmetically acceptable carrier to act as a diluent, dispersant or vehicle for the sorbate-loaded sol-gel derived composition, so as to facilitate its distribution when the composition is applied to the skin. Carriers other than or in addition to water can include liquid or solid emollients, solvents, humectants, thickeners and powders. Particularly suitable non aqueous carriers include polydimethyl siloxane and/or polydimethyl phenyl siloxane. Such formulations can additionally include colorants, sequestering agents, thickening or solidifying (consistency legislating) agents, emollients, UV absorbers, skin-protective agents, antioxidants and preservatives.

In some embodiments, the sol-gel derived composition is formulated in at least one liquid or non liquid pharmaceutically acceptable carrier. As used herein, “pharmaceutically acceptable carrier” encompasses any of the standard pharmaceutical carriers known to those of skill in the art. Pharmaceutically acceptable carriers include solvent(s), vehicle(s), adjuvant(s), excipient(s), binder(s), thickener(s), suspending agent(s), or filler substance(s) that are known to tire skilled artisan suitable for administration to human and/or animals. Other useful carriers include gum acacia, agar, petrolatum, lanolin, dimethyl sulfoxide (DMSO), normal saline (NS), phosphate buffered saline (PBS), sodium alginate, bentonite, carbomer, carboxymethylcellulose, carrageenan, powdered cellulose, cholesterol, gelatin, hydroxyethyl cellulose, hydroxypropyl cellulose, hydroxypropyl methylcellulose, methylcellulose, octoxynol 9, oleyl alcohol, polyvinyl alcohol, povidone, propylene glycol monostearate, sodium lauryl sulfate, sorbitan esters, stearyl alcohol, tragacanth, xanthan gum, chondrus, glycerin, trolamine, avocado oil, almond oil, coconut oil, coconut butter, propylene glycol, ethyl alcohol, malt, and malt extract.

Medicants include medicaments taken into the bodies of humans or non-human, vertebrate animals, or applied topically thereto, by a delivery system. A medicament is a therapeutic agent or substance, such as a drug, medicine, irrigant, bandage, or other medical or dental device, that promotes recovery from injury or ailment or prevents or alleviates the symptoms of disease. Medicaments containing the sorbate-loadel sol-gel derived composition can be formulated for any suitable systemic or non-systemic delivery system, including delivery systems for oral, enteral, or parenteral delivery routes include tablets, troches, lozenges, aqueous or oily suspensions, dispersible powders or granules, emulsions, hard or soft capsules, syrups, beverages, elixirs or enteral formulas, lavage or enema solutions, adhesive patches, infusions, injectates, intravenous drips, inhalants, or implants. Delivery systems also include topical creams, gels, suppositories, or ointments for non-systemic localized delivery or systemic delivery via the blood stream.

Systemic delivery systems that are contemplated by the present invention include, but are not limited to, implant; adhesive transdermal patches; topical creams, gels or ointments for transdermal delivery, transmucosal delivery matrices or suppositories or gels. It is contemplated that tire compositions of the present invention are formulated to deliver an effective amount of the sorbate by these or any other pharmaceutically acceptable systemic delivery system.

From the above description of the invention, those skilled in the art will perceive improvements, changes and modifications. For example, one skilled in the art will appreciate that other agents and materials, such as charged organic polymers (e.g., polyethyleneimine) and/or organosilica nanoparticles having different surface chemistries can be included in the sensor material to facilitate detection of sorbates. Such improvements, changes, and modifications are within the skill of the art and are intended to be covered by the appended claims.

I claim:

1. A method of treating a material comprising the step of applying an aromatically-bridged, organosiloxane sol-gel derived composition containing a plurality of alkylsiloxy substituents loaded with a first sorbate under conditions effective to treat the material with the first sorbate.

2. The method of claim 1 wherein the first sorbate is biologically active.

3. The method of claim 1 wherein the first sorbate is a pesticide, a herbicide or a pharmaceutical.

4. The method of claim 3 wherein the first sorbate is atrazine, 2,4-dichlorophenoxyacetic acid, malathion, dichlorodiphenyltrichloroethane, impramine, a vitamin or a polypeptide.

5. The method of claim 1 wherein the loading density of the sorbate in the sol-gel derived composition is from about 0.005 to about 5 gram sorbate per gram of the sol-gel derived composition.

6. The method of claim 2 wherein the loading density of the sorbate in the sol-gel derived composition is from about 0.005 to about 5 gram sorbate per gram of the sol-gel derived composition.

7. The method of claim 1 wherein the sol-gel derived composition is substantially completely loaded with the sorbate.

8. The method of claim 1 wherein the sol-gel derived composition is partially loaded with the sorbate.

9. The method of claim 8 further comprising applying a second sorbate after application of the first sorbate.

10. The method of claim 9 wherein the second sorbate is a water soluble organic liquid.

11. The method of claim 10 wherein the second sorbate is ethanol.

12. The method of claim 1 wherein the sol-gel derived composition is applied to a plant or an animal.

13. The method of claim 1 wherein the sol-gel derived composition is applied to a human.

14. The method of claim 1 wherein the sol-gel derived composition is applied to a soil.

15. The method of claim 1 further comprising applying an unloaded aromatically-bridged, organosiloxane sol-gel derived composition containing a plurality of alkylsiloxy substituents to the material along with the loaded sol-gel derived composition.

16. The method of claim 1 wherein the sol-gel derived composition includes inert particles having a diameter of from about 5 to about 20 nm.

17. The method of claim 16 where the inert particle is magnetic.

18. The method of claim 17 further comprising removing the sol gel-derived composition from the treated material with a magnetic device.

19. A composition of matter comprising:
an aromatically-bridged, organosiloxane sol-gel derived composition containing a plurality of alkylsiloxy substituents and a cosmetically acceptable carrier.

20. A composition of matter comprising:
a skin-care preparation, personal care preparation or light-protective preparation containing an aromatically-bridged, organosiloxane sol-gel derived composition containing a plurality of alkylsiloxy substituents.

21. A composition of matter comprising:
an aromatically-bridged, organosiloxane sol-gel derived composition containing a plurality of alkylsiloxy substituents and a non-liquid pharmaceutically effective carrier.

22. A composition of matter comprising:
a sorbate-loaded aromatically-bridged, organosiloxane sol-gel derived composition containing a plurality of alkylsiloxy substituents and a cosmetically acceptable carrier.

23. A composition of matter comprising:
a skin-care preparation, personal care preparation or light-protective preparations containing a sorbate loaded aromatically-bridged, organosiloxane sol-gel derived composition containing a plurality of alkylsiloxy substituents.

24. A composition of matter comprising:
an aromatically-bridged organosiloxane sol-gel derived composition containing a plurality of alkylsiloxy substituents loaded with a first sorbate and a non-liquid pharmaceutically effective carrier.

* * * * *